United States Patent [19]

Betts et al.

[11] 4,184,634
[45] Jan. 22, 1980

[54] CLOSED LOOP CONTROL FOR AUTOMATIC TEMPERATURE CONTROL SYSTEM

[75] Inventors: Jeri A. Betts, Utica, Mich.; Van P. Spiker, Newport News, Va.

[73] Assignee: The Bendix Corporation, Southfield, Mich.

[21] Appl. No.: 900,544

[22] Filed: Apr. 18, 1978

[51] Int. Cl.² .................................................. G05D 11/16
[52] U.S. Cl. .................................. 236/13; 236/68 R; 236/78 C
[58] Field of Search .................. 236/68 R, 87, 78.8, 236/13; 251/11; 237/2 A; 337/105

[56] References Cited

U.S. PATENT DOCUMENTS

| | | | |
|---|---|---|---|
| 3,165,681 | 1/1965 | Pinckaers | 236/78 C |
| 3,391,317 | 7/1968 | Bell | 236/78 C |
| 3,639,824 | 2/1972 | Malavasi | 165/26 X |
| 3,730,819 | 5/1973 | Evalds | 165/26 |
| 4,072,268 | 2/1978 | Perris | 236/78 C |
| 4,078,721 | 3/1978 | Okuhara | 236/78 C |

OTHER PUBLICATIONS

Copending eariler filed commanly assigned application to Bata et al #833,407.

*Primary Examiner*—William E. Wayner
*Attorney, Agent, or Firm*—William A. Marvin; Russel C. Wells

[57] ABSTRACT

A closed loop control circuit for regulating the response of an automatic temperature control system is disclosed. The temperature control system provides automatic regulation of the temperature for the passenger compartment of a vehicle by positioning a blend air door in response to three control parameters. Two of the control parameters, the actual temperature of the passenger compartment and the desired temperature of the passenger compartment, are serially combined in one leg of a bridge circuit and compared against another leg of the bridge presenting the third control parameter, the position of the blend door. An unbalanced condition in the bridge circuit is corrected by the repositioning of the blend door until the error between the two legs is nulled. Repositioning is accomplished by a pair of differential amplifiers which detect the sense of the error and thereafter provide an interrupter control function to a vacuum modulator. The interrupter control function is accomplished by current limiting open collector output devices in the amplifiers. The interrupter function regulates the vacuum level in the modulator which positions the blend air door through a vacuum actuator.

6 Claims, 4 Drawing Figures

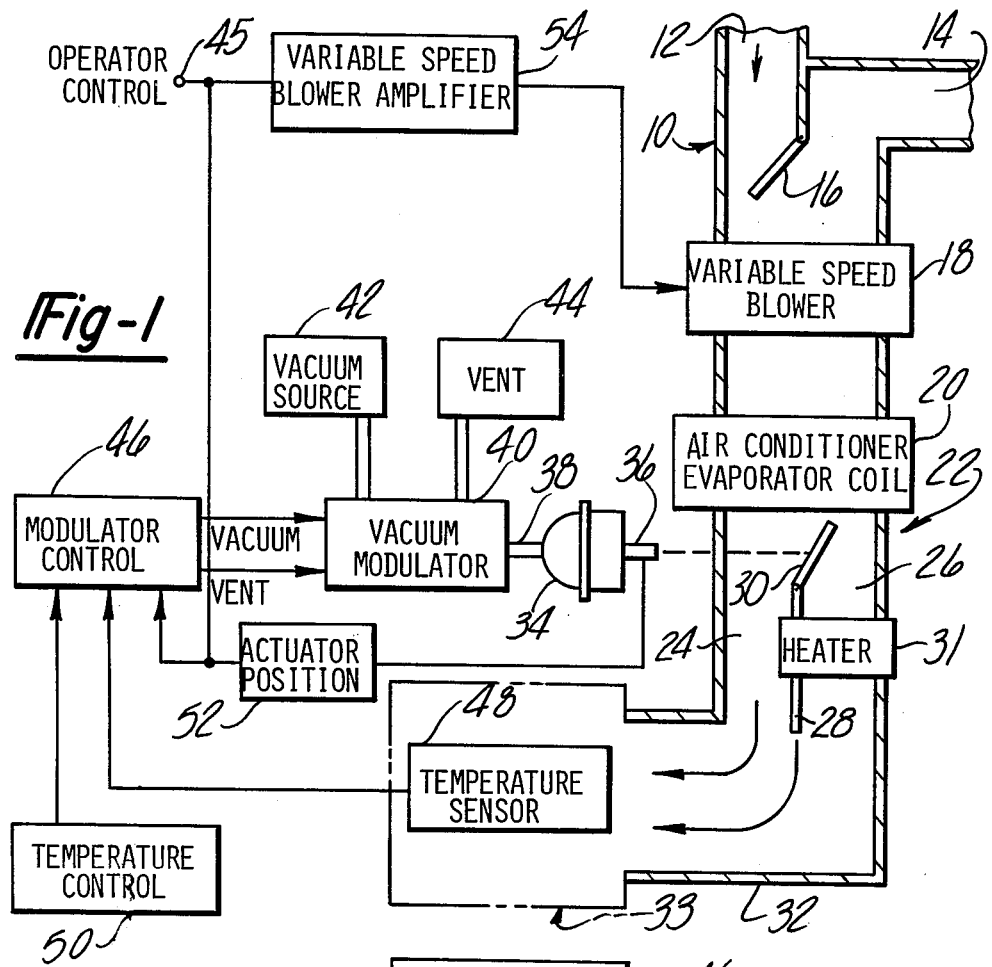
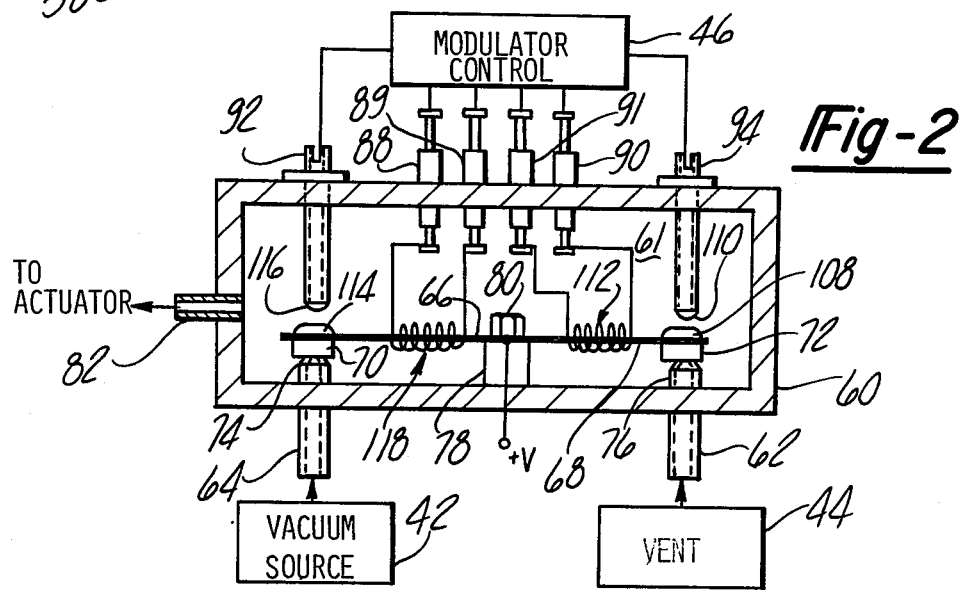

CLOSED LOOP CONTROL FOR AUTOMATIC TEMPERATURE CONTROL SYSTEM

BACKGROUND OF THE INVENTION

1. Field of the Invention

The invention pertains generally to automatic temperature control systems for the passenger compartments of vehicles and is more particularly directed to a closed loop modulator control circuit for regulating the response of such systems.

2. Prior Art

The most widely used temperature control systems for vehicles today are those with a manual temperature control selector and a manual blower or fan control selector. An operator by selecting differing combinations of positions for these controls can achieve a reasonable degree of comfort in the passenger compartment during most ambient conditions requiring heat.

The problem with such systems is their inconvenience because of the necessity for constant readjustment. When initially bringing the passenger compartment up to temperature in cold ambient conditions, the normal person will use the highest heater setting and highest blower speed or wait longer than need be for comfort. As the vehicle warms at the maximum output of the heater and the desired temperature of comfort is exceeded, a readjustment of blower speed and heater setting is attempted. Thereafter, readjustment of the combined settings is a conjecture on the part of the operator where the final temperature of the compartment will stabilize. If he, as most operators do, guesses wrong, further adjustments will be tried until a satisfactory temperature is reached.

To answer the need for a more facile method of providing comfort to passengers of automotive vehicles than before, automatic temperature control systems have been devised. One particularly advantageous system has air ducting through which an air flow is directed by means of a blower. The ducting is provided with a diverter box which proportions the air flow between a bypass duct passage and a heater passage containing a heater core. A variably positioned blend air door proportions the quantity of air passing into either the bypass duct or the heater duct so as to control the temperature of the air flowing out through the ducting. The ducting vents into the passenger compartment and further provides for the recirculation of the passenger air and mixing with some outside air for ventillation.

The temperature control is carried out by means of a manual temperature selector device such as a rheostat and a passenger compartment temperature sensor such as a thermistor. The thermistor and rheostat produce electrical control signals (resistance changes) corresponding to the sensed temperature level and the desired temperature level respectively. Upon development of a temperature error signal indicating a difference between the selected temperature and the actual temperature, regulation of the position of the blend door is initiated.

The positioning is realized by applying the error signal to a vaccum modulator device which generates a vacuum pressure level corresponding to the error signal. The vacuum level is fed to a vacuum operated actuator which then positions the blend air door. The system variables are calibrated such that the change in position of the blend air door increases or decreases the temperature of the air flow within the ducting system so as to correct the temperature level in the passenger compartment.

For a sensed temperature above the selected temperature level, the vacuum level is adjusted to cause the blend air door to assume a position whereby more air is directed through the bypass into the passenger compartment. Conversely, if the sensed temperature level is below that selected, the blend air door position is adjusted to increase the temperature of the air passing into the passenger compartment to correct the temperature differential. The degree of error signal of either sense determines the extendt of movement of the blend air door in the direction tending to correct the temperature difference condition.

The vacuum modulator for this system provides the vacuum level in response to the input signals of a modulator control circuit. The modulator has an interior chamber that is ported to communicate with a vacuum source and a vent source. Each port is closed by a valve means attached to the end of a bimetal arm around which is wound a heater coil. Opposite each valve means, an interrupter contact is positioned such that when a particular bimetal arm is deflected the contact will close. The modulator control circuit changes the vacuum level by energizing the heater coil of the arm associated with the vacuum source, if a greater level is desired, or energizing the heater coil of the arm associated with the vent source, if a lower vacuum level is desired. Control of the current levels in the heater is provided by pulsing the coils with current in response to the interrupter contacts making and breaking as the bimetal arms open and close the ports.

Although superior in performance, for an automatic temperature control system to compete effectively against the present manual system, it must also rival the manual system in simplicity. Thus, the reduction of circuit complexity in the modulator control circuit while still maintaining adequate control is necessity. Prior modulator control circuits have neither optimized closed loop response nor effected the desirable goal of circuit simplification. Therefore it would be advantageous to provide a modulator control circuit which acheives both of the aforesaid objectives.

SUMMARY OF THE INVENTION

The invention provides an improved closed loop modulator control circuit for an automatic temperature control system.

The modulator control circuit includes a bridge having two signal nodes that produce an error voltage between the nodes indicating an unbalanced condition in the system. In a preferred form, the bridge has a temperature sensor, responsive to variation of temperature in the passenger compartment of the vehicle, in series with a temperature control selector, responsive to manual operator selection, located in one leg between one of the signal nodes and a reference node. In another leg between the other signal node and the reference node is an actuator position sensor, responsive to the position of the blend door. The movements of the blend door are utilized to rebalance the system and null the error voltage between the nodes.

The sense or polarity of the error voltage indicates in which direction the blend door is to be moved. The sense of the error signal is detected by differential control means which provide an open blend door signal or a close blend door signal via separate signal control lines to a pair of driver circuits. The driver circuits apply current to associated heater coils of a vacuum modulator responsive to the respective open or close signals to change the level of vacuum in the modulator and thereby position the blend door.

The current levels of the heater coils are controlled by interrupter contacts of the modulator signaling the differential control means via the signal control lines to interrupt current to the heater coils when the bimetal arms of the modulator deflect and open the ports of the modulator. When the interrupter contacts signal the differential control means that the current has been interrupted and the associated ports have been closed, the differential control means will again apply current to the heater coils. The driver circuits are alternately energized and cycled by the diffential control means depending upon the sense of the error signal.

Preferably, the differential control means includes a open collector differential amplifier with current limitation associated with each driver circuit. By using such a device the detection of the sense of the error signal and the control of the heater coil current can be incorporated into one device thereby significantly reducing not only driver circuitry but also simplifying the overall system circuit.

Further included in the differential control means is a dead space means which produces a hysteresis in the closed loop feedback characteristic of the circuit to allow the system to come to rest without hunting over small excursions. The elimination of the hunting characteristic when the error has been nulled, increases the stability of the system and reduces wear on the moving mechanical parts of the system.

Accordingly, it is a major object of the invention to provide improved closed loop control of an automatic temperature control system.

It is another object of the invention to provide an improved control with a closed loop modulator control circuit effecting a significant reduction in control circuitry.

It is still another object of the invention to provide the modulator control circuit with differential control means including means adapted to detect the sense of an error signal and control an interrupted driver circuit simultaneously.

It is still a further object of the invention to provide the differential control means with dead space compensation to eliminate hunting.

These and other objects, features, and aspects of the invention will be more fully apparent upon a reading of the following detailed specification if taken in conjunction with the appended drawings wherein:

BRIEF DESCRIPTION OF THE DRAWINGS

FIG. 1 is a system block diagram of an automatic temperature control system for the passenger compartment of vehicles which is constructed in accordance with the invention;

FIG. 2 is a sectioned side view of the vacuum modulator for the automatic temperature control system illustrated in FIG. 1;

DETAILED DESCRIPTION OF THE DRAWINGS

Figure 3:
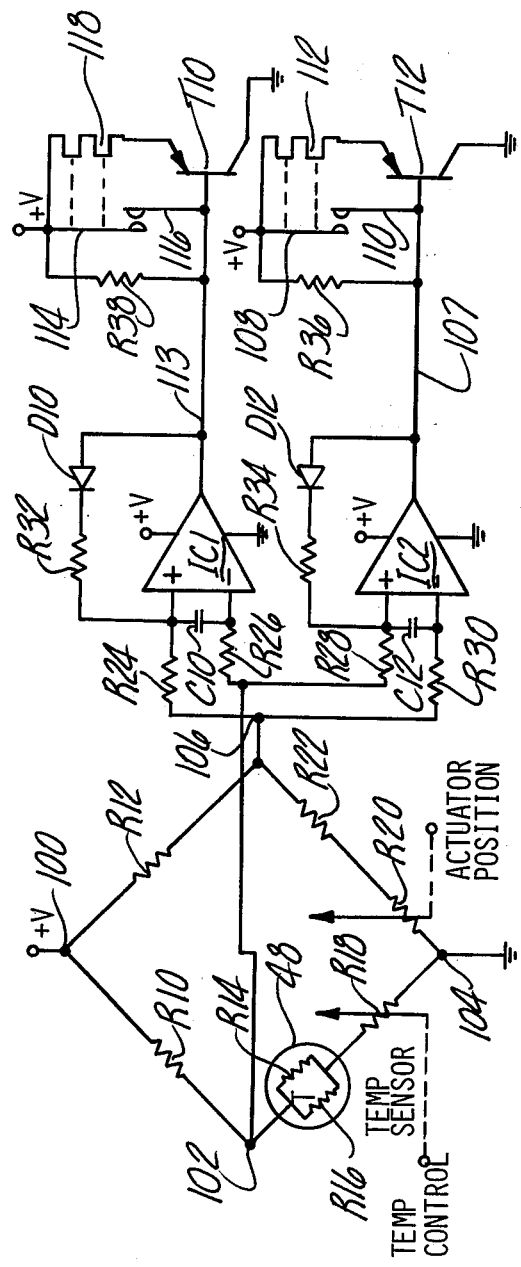
FIG. 3 is a detailed schematic diagram of the modulator control circuit for the automatic temperature control circuit illustrated in FIG. 1.

Referring to the drawings and particularly FIG. 1, the system according to the present invention has been developed for application to an automatic temperature control system for passenger compartments of automotive vehicles. The invention is however, equally applicable to other vehicles such as trucks, farm machinery, recreational vehicles, etc.

Such systems typically comprise a ducting system 10 for drawing in a mixture of outside air and compartment air through respective duct passages 12 and 14. Typically, an operator controlled damper 16 is provided to control the proportion of outside and inside air drawn into the system depending on the conditions of operation. For example, during cold engine startup or when the passenger compartment has become overheated during warm weather, maximum application of the heater or air conditioner, respectively, dictates that only compartment air be circulated through the ducting 10 in order to speed the heating or cooling of the passenger compartment to more comfortable levels and therefore damper 16 would be fully closed. Various settings are then available for ventilation once a proper temperature has been achieved.

The air flow is directed through the ducting system 10 and air conditioner evaporator coils 20, located within a section of the ducting 10. The evaporator coils 20 receive liquified refrigerant from the air conditioning system so as to cool the coils and thereby the air circulated within. The passage of the air through the evaporator coils 20 can include a filtering operation if desired.

The air flow is subsequently directed to a diverter box portion 22 of the ducting 10, comprised of a pair of duct passages, a bypass duct 24 and a heater duct 26 created by a partition 28. The air flow is proportioned between the bypass duct 24 and the heater duct 26 by means of a movable blend air door 30 which can be positioned so as to divide the air flow either all through the bypass duct 24 or all through the heater duct 26, or any ratio therebetween.

A heater core 31 is mounted in the heater duct 26 and acts to heat the proportioned air flow diverted thereto and thus the blend air door controls the temperature of the air downstream of the diverter box 22 in the lower ducting 32 which communicates with the passenger compartment 33. The air passing out of the air conditioner evaporator 20 is not heated and is thus at a minimum temperature when the blend air door 30 is in the position diverting maximum flow to the bypass duct 24. In the opposite direction, when maximum flow is diverted to the heater duct 26, the temperature of the air in the downstream ducting 32 is a maximum temperature. It is evident that combining the evaporator coil and heater air flow in such a manner will provide for either heating or cooling the passenger compartment.

The position of the blend air door 30 is determined by the position of a vacuum operated actuator 34 which has an output member 36 mechanically linked to the blend air door 30. The vacuum operated actuator 34 is of the type responsive to modulated vacuum pressure in a line 38 to vary the position of the output member 36 in correspondence with the pressure level in line 38. The pressure level in line 38, in turn, is controlled by a vacuum modulator 40 which controls the communication of an interior chamber or plenum connected to line 38 with a source of vacuum 42, such as the engine intake manifold, and a vent source 44, such as atmospheric pressure. The varying level of vacuum in the plenum creates a similar pressure in line 38 which varies below atmospheric so as to position the vacuum operated actuator 34 and output member 36.

The communication of the vacuum source 42 and vent source 44 with the interior chamber of the vacuum modulator 40 in turn is regulated by control signals received from a modulator control circuit 46 which receives electrical signals from a temperature sensor 48 located in passenger compartment 33, from a manual temperature selector control 50, and an actuator position sensor 52 which senses the position of the blend door by a linkage to the actuator output member 36.

The passenger compartment temperature sensor 48 is placed to sense the actual temperature of the interior of the passenger compartment at an appropriate point within the compartment which is usually for convenience, the dash control of the vehicle. The sensor 48 preferably can be a thermister which changes electrical resistance dependently upon actual passenger compartment temperature.

Manual temperature control 50 is that part of the temperature control system in which the desired temperature level may be manually set by the user and may take the form of a rheostat or other equivalent device so as to generate an electrical signal corresponding to the desired temperature.

Actuator position sensor 52 is preferably a rheostat or other equivalent device which has a physical control link to output member 36 and thereby changes its resistance dependently upon the position of blend air door 30.

Each of these elements may be of conventional design and many suitable devices are available to satisfactorily produce the corresponding electrical signals and accordingly further details of the same are not here included.

The three modulator control input signals are compared within the modulator control 46 to produce a temperature error signal which causes either the vacuum source 42 or the vent source 44 to be placed in communication with the interior of vacuum modulator 40. The variance of pressure in accordance with the sense of the error signal causes the vacuum operated actuator 34 to be operated to position the blend air door 30 in a position corresponding to an appropriate change in the temperature of the air passing into the ducting 32 in order to promptly produce the temperature correction.

The signals generated by the temperature sensor 48, the manual temperature control selector 50 and the actuator position sensor 52 are appropriately related such that for each difference between the selected temperature and the sensed temperature, there is a corresponding position of the air blend door 30, which is sensed by the actuator position sensor 52.

The corresponding position signal value is appropriately balanced against the temperature error signal by the modulation control 46 to null the error signal upon achievement of this value. This efficiently provides an initial feedback for coarse adjustment of the temperature control system. A fine adjustment or second feedback occurs as the changing temperature of the passenger compartment causes the temperature error signal to be regenerated because of the temperature sensor signal.

Thus, the blend air door 30 will first assume adiverting position proportioned to the magnitude of the temperature error signal in a direction such as to tend to reduce the error signal, i.e., to a relatively great proportion of flow of air into either the bypass or heater duct to cool or heat the passenger compartment to reduce or increase the passenger compartment temperature. As the temperature changes, the temperature error signal likewise reduces and the blend air door accordingly will typically assume several positions as the actual temperature of the passenger compartment is brough to the manually selected temperature level.

It will be appreciated that the response of the control system is rapid and becomes stabilized quickly since the temperature error is continuously nulled by the feedback of the actuator position signal which is developed much more rapidly than the change in compartment temperature which varies with the position of the blend air door 30. The coarse and fine adjustments provide optimum response for an automatic temperature control system where if the difference between actual and desired temperature is great the system should respond rapidly but then stabilize without hunting over a wide temperature range.

The blower 18 may be continuously varied in correspondence with the actuator position signal to further achieve the desired control result by means of a continuously variable blower amplifier 54 responsive to the position signal. The blower 18 continuously varies its speed and hence the air flow in the ducting 10 to increase the capacity of heating or cooling in either extreme position of the blend air door 30. The variable speed blower amplifier 54 can thus be entirely automatic or further include an operator input at terminal 45 to control the speed. The blower speed is preferably at a maximum at extreme positions and is reduced as the blend air door 30 reaches its median position.

An appropriate and advantageous pressure transduceer design suitable for use as the vacuum modulator 40 is the subject of co-pending application Ser. No. 832,142, filed in the names of G. T. Bata and V. P. Spiker and commonly assigned with the present application. The disclosure of Bata and Spiker is hereby expressly incorporated herein by reference.

The vacuum modulator 40 illustrated to advantage in FIG. 2 in cross section incorporates two heated bimetal actuators. The modulator 46 further includes a sealed enclosure or housing 60 which has a pair of inlet ports 62 and 64. Inlet port 64 is connected to the vacuum source 42 with port 62 being connected to the vent source 44. A pair of bimetal arms 66 and 68 (which may be formed from a single strip) are equipped with a pair of sealing valves 70 and 72, respectively, which are adapted to be biased against the terminus or valve seats of the ports 62, 64 existing within the interior plenum chamber 61 of the sealed enclosure 60.

Bimetal arms 66, 68 control the communication of the ports 62 and 64 and consequently the connected vacuum and vent sources 42 and 44, with the interior chamber 61 of the sealed enclosure 60. The bimetal arms 66 and 68 are designed so as to be biased into the seating position shown in FIG. 2 throughout and substantially above the range of ambient temperature which will be encountered in normal service. The bimetal arms 66 and 68 are mounted to the pedestal 78 by means of a screw 80 threadedly engaging the pedestal 78 so as to cantilever each of the bimetal as shown.

The vacuum developed within the sealed enclosure 60 is communicated to the vacuum operated actuator device via an outlet port 82. The pressure within the interior chamber 61 can be varied to either be increased or decreased by a controlled interval of full communication to either the port 62 or 64 with the interior chamber 61 by unseating of the valve 70 or 72 with an upward movement of the bimetal arms 66 or 68, respectively, which in turn would increase or decrease the pressure existing within the passages in communication therewith. The upward deflection of either of the arm 66 or 68 is accomplished by heating the bimetal elements 66 or 68 by current flowing in heater windings 118 or 112 which are wound thereon.

Heater windings 118 and 112 are energized by the error signal produced in the modulator control 46 of either sense requiring a change in position of the vacuum operated actuator 34 in a direction corresponding to either raising or lowering of the pressure produced in the interior chamber 61 and the connected passages. The heater windings 118 and 112 are controlled by electrical signals applied to the coil connections at heater terminals 88, 89, 90, 91 respectively.

The movement of either the bimetal arms 66 or 68 produces an engagement of an interrupter contact 114 or 108 with stationary contacts 116, 110 respectively which causes an interruption of the heating current associated with heater windings 118 and 112. This controls the heating of the bimetal arms 66 or 68 such that the cooling of either the bimetal arms 66 or 68 allows either of these to again be lowered and thus allowing the heater circuits to again be energized. Such movement of the bimetal arm 66 and 68 when actuated may consist of slight oscillating movements into and out of contact with the stationary contacts 116, 110 while allowing the continued interrupted communication of the respective port 74 or 76 with the interior chamber 61. Thus, the modulator control 46 receives information on whether the port is open or closed with a high potential indicating an open port. The high potential is supplied via the source voltage +V connected to the bimetal arms at pedestal 78.

The advantages of the interrupted mode of operation is that the heating of the bimetal can be more accurately controlled and its response may be much more rapid since large heating currents can be utilized without danger of overheating of the bimetal upon continued application of the heating currents as is described in more detail in the above mentioned co-pending patent application.

The modulator control circuit 46 will now be described in more detail if reference is directed to FIG. 3 and FIG. 4. The modulator control comprises a bridge circuit having nodes 100, 102, 104, and 106. Node 100 is connected to a positive voltage source +V and node 104 is connected to ground.

A first leg of the bridge is formed by a resistor R10 connected between node 100 and node 102. R10 is substantially equivalent in value to a resistor R12 forming a second leg of the bridge by being connected between node 100 and node 106. A third leg of the bridge is formed between node 106 and node 104 and comprises the serial connection of a fixed balance resistor R22 and the actuator position sensor 52 including a variable resistor R20 which has a wiper that moves in concert with the actuator arm 36. The temperature sensor 48 having a compensation resistor R14 in parallel with a temperature sensitive thermister R16 is serially connected with temperature control 50 including a variable resistor R18 which has a wiper fixed to the manual temperature control selector. Sensor 48 and resistor R18 are connected between nodes 102 and 104 to form a fourth leg of the bridge circuit.

The voltages developed between nodes 102 and 106 forming the error signal are transmitted to a differential control means including differential amplifiers 1C1, and 1C2 for further processing. Node 102 is connected to the noninverting input of amplifier 1C2 via a resistor R28 and to the inverting input of amplifier 1C1 via a resistor R26. Node 106 is connected to the noninverting input of amplifieer 1C1 via a resistor R24 and to the inverting input of amplifier 1C2 via resistor R30. Further, connected between the inverting and noninverting inputs of amplifier 1C1 is a delay capacitor C10. In a similar manner a delay capacitor C12 is connected between the inverting and noninverting inputs of amplifier 1C2.

Dead space compensation is provided by a positive feedback loop comprised of a resistor R32 in series with a diode D10 connected between the output terminal of the amplifier 1C1 and its noninverting input. Likewise, amplifier 1C2 has a positive feedback loop connected between its output terminal and noninverting input consisting of the serial connection of a resistor R34 and a diode D12. Both amplifieers 1C1, 1C2 have their power supply pins connected between a positive supply voltage +V and ground.

The output terminal of the amplifier 1C1 is connected via a signal control line 113 to the base or control lead of a PNP power transistor T10 which has an emitter (power) lead connector to a positive voltage supply volt +V through the heater coil 118 and a collector (power) lead connected to ground. The base terminal of transistor T10 further has connected thereto a bias resistor R38 forming a parallel circuit with the pair of normally open interrupter contacts 114, 116. A positive voltage supply +V feeds the parallel circuit to reverse bias the base of the transistor T10 through the resistor R38 and to apply a control signal to signal control line 113 via the contacts.

Identical circuit components are provided for another conduction device (power transistor) T12 which has a parallel connection of a bias resistor R36 and the set of normally open interrupter contacts 108, 110 connected between the base lead and the positive voltage supply + V. The PNP power transistor T12 further has its base lead connected to the output terminal of amplifier IC2 via a signal control line 107, its emitter lead connected to the positive voltage supply + V through the heater coil 112, and its collector lead connected to ground. The transmitters T10, T12 with their associated bias resistors R38, R36 form the simplified drivers circuits that are controlled by the signal control lines 113, 107 respectively from the differential control means.

In operation, the unbalancing of the bridge circuit will produce an error voltage signal across nodes 102, 106, which transmitted to the differential control means, will turn on either amplifier lC1 or amplifier lC2 into a control mode depending upon the polarity of the signal. A higher positive voltage at the inverting input than at the noniverting input of amplifier IC1 will cause the grounding of signal control line 113 and similarly a higher positive voltage at the inverting input than at the noninverting input of amplifier IC2 will cause the grounding of a signal control line 107. The capacitors C10, C12, slow the transitions between the changing polarities of the nodes 102, 106 so that the amplifiers do not oscillate between off and on when passing through the transitional values as is known in the art.

Therefore, only one amplifier will be in the control mode at any time because of the delay capacitors and further, hunting between the two amplifiers at small error values will be eliminated by the dead space means. The dead space means accomplish this with a hysteresis in the switching characteristics of each amplifier such that if the amplifier IC1 is off, it will remain off until the error voltage not only reverses polarity but increases past a hysteresis level set by the value of the positive feedback loop R32, D10.

Hysteresis can be increased in the system by lowering the values of R32, R34 until the system does not hunt. There is no hystersis level in the opposite direction and the amplifiers will turn off when the polarity changes at the input terminal. Thus after one amplifier turns off there is a dead space until the other turns on thereby allowing the system to stabilize.

During the control mode, the amplifiers will control the vacuum level in the vacuum modulator via the control signal lines and drivers circuits to reposition the vacuum actuator and consequently the blend door. The result of repositioning the blend door will be fed back through the actuator position resistor R20 and the temperature sensor 48 to rebalance the bridge and null the error voltage.

One control input to the bridge is from the temperature sensor 48 which, because of the temperature dependent thermister R16, causes an increase or decrease in the current flowing through the fourth leg of the bridge responsive to the temperature in the passenger compartment of the vehicle. Particularly, an increase to temperature will decrease the sensor resistance and a decrease in the temperature of the compartment will increase sensor resistance. Thus, node 102 will be at a higher positive voltage for low compartment temperatures and at a lower voltage for high compartment temperatures because of the temperature sensor input.

Another control input in the fourth leg of the bridge is the variable resistor R18 which varies the current through the leg in response to the vehicle operator moving the temperature control selector arm. If the operator desires an increase in the passenger compartment temperature, the temperature control is moved such that the resistance of the variable resistor R18 increases. Conversely, desired decrease in temperature can be effected by operating the temperature control such that the resistance of the variable resistor R18 decreases. As was the case with the temperature sensor 48 an increase in resistance will cause a higher positive voltage at node 102 and a decrease in resistance a lower positive voltage.

A third control input is provided in the third leg of the bridge by changing resistor R20 in response to the actuator position. For actuator positions where the blend door is mixing a greater percentage of heated air with the total amount of air output in the passenger compartment, the resistance is increased. While the blend door is closing the less air is bypassed through the heater, the resistance R20 will be decreasing. Increasing the resistor R20 will raise the voltage at node 106 and decrease the resistance of resistor R20 will decrease the voltage at the node.

The voltage at node 106 will then attempt to balance the voltage at node 102 by the movement of the blend door. For example, when the actual temperature in the passenger compartment is below that set on the temperature control, a relatively high positive voltage will appear on node 102 and cause an opening of the blend door via amplifier IC1 with a greater percentage of the circulated air being diverted to the heater. This action will cause the actuator position to increase the voltage at node 106 until a null condition occurs and the blend door is coarsely positioned.

The temperature sensor 48, meanwhile is lowering the voltage at node 102 in response to the increasing air temperature in the compartment. The fine adjustment to the blend air door position occurs at this time as the actuator position follows it down and reduces the voltage at node 106.

When the temperature in the passenger compartment is above that set on the temperature control, the opposite will occur. A higher voltage will appear on node 106 and cause the closing of the blend door via amplifier IC2 with a smaller percentage of circulated air being diverted to the heater. This coarse positioning results in the voltage at node 106 being lowered because of the decreasing resistance of resistor R20. At the same time, the lowering of the temperature in the passenger compartment results in a fine adjustment by increase in the voltage at node 102 because of the increasing resistance of the temperature sensor 48. Both of these actions, as was similarly described for the under temperature condition, will rebalance the bridge.

Figure 4:
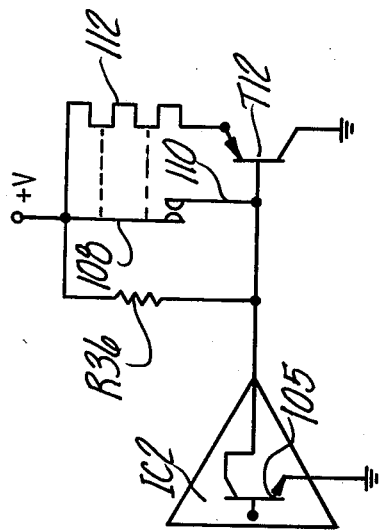
FIG. 4 is a detailed partial schematic of a portion of the modulator control circuit illustrated in FIG. 3.

To understand the interrupter mode operation for the opening to closing the blend door, attention should be directed to FIG. 4, illustrations of the amplifier IC2 and the transistor T12. Amplifier IC2 is an open collector differential amplifier which will sink current through an NPN output transistor 105 if the voltage at the inverting input is greater than the voltage at the noninverting input. For voltages at the noninverting input greater than at the inverting input, the open collector output transistor 105 is nonconducting.

Such amplifiers also usually include current limiting in their internal circuitry for protection of the output device. This current limiting is caused by the current drive to the base being set at a fixed amount during conduction. The collector current is then regulated as the gain of the device multiplied by the fixed base drive and will sink that amount of current as a maxiumum regardless of value of the pull-up resistor. The invention uses this feature of the amplifiers IC1, IC2 to advantage to control current levels to the heater coils with one device and thereby reduce system circuitry. A preferred differential amplifier, as above described, including an open collector output device with current limiting is a No. 2901 manufactured by the National Semiconductor Corporation. Other similar devices are available either in open collector, emitter, drain or source configuration. Current limiting is also referred to as short circuit protection in some of these devices.

Thus, when node 106 is at a higher voltage than node 102, the amplifier IC2 will sink current into the output transistor 105 and as a consequence pull signal control line 107 near ground potential. The control line 107 will reach substantially ground potential because the value of the pull-up R36 is great enough to drop the entire supply voltage across it when the collector current of the device 105 is less than or equal to the maximum. Transistor T12 which until this time is biased in a non-conducting mode by the resistor R36 now conducts. The conduction of the transistor T12 causes current to flow through the heater 112 and heat the bimental strip. The strip will deflect and open the vent port of the vacuum modulator resulting in a decrease in the vacuum level in the actuator to reposition the blend door.

The deflection of the bimetal also results in the closing of the interrupter contacts 108 and 110. When the contact 108, 110 are operated, full supply voltage + V is applied the control line 107. The output transistor 105 will current limit and therefore cause the collector voltage to rise. This will apply nearly full supply potential to the base of the transistor T12 and its conduction will cease. The nonconducting state of the transistor T12 causes the interruption of heater current and a deflection of the bimetal strip to a closed position as it cools. The return deflection breaks the contacts 108, 110 thereby removing the current limiting condition to start the heating process once again.

The interrupted control of the vent port continues to close the blend door in a series of steps until the transistor 105 becomes nonconductive. This condition will occur when the bridge rebalances and node 102 has a higher voltage than node 106 as indicated previously.

While a preferred embodiment of the invention has been described, it will be obvious to those skilled in the art that the various modification and changes may be made to the system without departing from the spirit and scope of the invention as defined in the appended claims.

What is claimed as having an exclusive right therein is:

1. An automatic temperature control system for regulating the temperature of a passenger compartment including a temperature sensor responsive to the actual temperature of the passenger compartment providing an electrical signal indicative thereof; a temperature control selector responsive to a desired temperature of the passenger compartment providing an electrical signal indicative thereof; an actuator position sensor responsive to the position of a blend air door providing an electrical signal indicative thereof; and a modulator control circuit responsive to the temperature sensor signal, the temperature control signal, and the actuator position signal, which regulates the vacuum level in a vacuum modulator to position the blend air door wherein the improvement comprises the modulator control circuit including:

bridge circuit means for sensing a difference between the desired temperature of the passenger compartment and the actual temperature of the passenger compartment and for generating an error signal indicating by its polarity the sense of the difference;

differential control means for detecting the sense of the error difference, for generating an open blend door signal over a first signal control line to a driver circuit controlling a vent port of the vacuum modulator in response to one polarity of error and for generating a close blend door signal over a second signal control line to a second driver circuit controlling a vacuum port of the vacuum modulator in response to the other polarity of error, wherein said open and close blend door signals are generated by sinking a predetermined current from said driver circuits over said control lines;

each of said driver circuits including an impedance and an interrupter contact connected in parallel between a supply voltage and an associated control line such that the control line which is initially at an off signal level will transition to an on signal level during said open and close blend door signals and further will transition from said on level to said off level when the interrupter contact closes, said driver circuit further including means for opening said port and thereafter closing said interrupter contact in response to said on level and for opening said interrupter contact and thereafter closing said port in response to said off level.

2. An automatic temperature control system as defined in claim 1 wherein:

said differential control means includes dead space means for compensating the hunting of the closed loop system at small error signals.

3. An automatic temperature control system as defined in claim 2 wherein said dead space means include means for providing a dead space between the time one of the open and close blend door signals is turned off and the other signal is generated.

4. An automatic temperature control system as defined in claim 3 wherein said differential control means include;

a differential amplifier with a current limited output transistor electrically connected to each control line.

5. An automatic temperature control system as defined in claim 4 wherein:

said output transistor is an open collector NPN transistor electrically connected at its collector terminal to said control line.

6. An automatic temperature control system as defined in claim 5 wherein:

said means for opening and closing include a PNP transistor with its power teminal serially connected with a heater winding of a flexible bimetal arm between a supply voltage and ground, said PNP transistor having its base terminal electrically connected to said control line.

* * * * *